US012611681B2

(12) United States Patent
Karwoski, Jr. et al.

(10) Patent No.: US 12,611,681 B2
(45) Date of Patent: Apr. 28, 2026

(54) FOAM NOZZLE SPREADER TIP

(71) Applicant: The Government of the United States of America, as represented by the Secretary of the Navy, Arlington, VA (US)

(72) Inventors: Stanley Karwoski, Jr., Lusby, MD (US); John P. Farley, Burke, VA (US); Christopher Pfutzner, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 198 days.

(21) Appl. No.: 18/434,547

(22) Filed: Feb. 6, 2024

(65) Prior Publication Data

US 2024/0261805 A1 Aug. 8, 2024

Related U.S. Application Data

(60) Provisional application No. 63/484,892, filed on Feb. 14, 2023, provisional application No. 63/483,617, filed on Feb. 7, 2023.

(51) Int. Cl.

| | |
|---|---|
| ***B05B 1/04*** | (2006.01) |
| ***A62C 31/02*** | (2006.01) |
| ***A62C 31/12*** | (2006.01) |
| ***B05B 7/02*** | (2006.01) |
| ***B05B 15/65*** | (2018.01) |
| ***B05B 15/658*** | (2018.01) |

(52) U.S. Cl.
CPC .............. *B05B 1/042* (2013.01); *A62C 31/02* (2013.01); *A62C 31/12* (2013.01); *B05B 1/04* (2013.01); *B05B 1/044* (2013.01); *B05B 7/025* (2013.01); *B05B 15/65* (2018.02); *B05B 15/658* (2018.02)

(58) Field of Classification Search
CPC B05B 1/04; B05B 1/042; B05B 1/044; B05B 7/025; B05B 15/65; B05B 15/658; A62C 31/02; A62C 31/12
See application file for complete search history.

(56) References Cited

U.S. PATENT DOCUMENTS 577,362 A * 2/1897 Ettlinger ................. B05B 1/044 239/592
813,254 A * 2/1906 Sweeney ................. B05B 7/025 239/588
927,449 A * 7/1909 Carnahan ................ B05B 1/044 239/592

(Continued)

OTHER PUBLICATIONS

Farley et al., "ESTCP WP20-5373 Fluorine-Free Foam (F3) Military Specification Development—Final Report" (Feb. 1, 2023).

*Primary Examiner* — Jason H Duger
(74) *Attorney, Agent, or Firm* — US Naval Research Laboratory; Joseph T. Grunkemeyer

(57) ABSTRACT

Disclosed herein is an article used as a foam nozzle spreader tip. The article is brass or stainless steel and has a first surface, a hollow space removed from the first surface, first and second screw holes through the article and the first surface but not touching the hollow space, and a third screw hole through the article touching the hollow space. The hollow space has a half-cylinder region and a rounded trapezoidal prism region.

4 Claims, 9 Drawing Sheets

(56) References Cited

U.S. PATENT DOCUMENTS

| | | | | | |
|---|---|---|---|---|---|
| 1,033,195 | A * | 7/1912 | Robinson | B05B 1/044 | 239/592 |
| 1,186,117 | A * | 6/1916 | Moe | B05B 1/044 | 239/592 |
| 1,239,373 | A * | 9/1917 | Farmer et al. | B05B 1/042 | 239/594 |
| 2,116,863 | A * | 5/1938 | Dinley | B05B 1/042 | 239/594 |
| 4,688,720 | A * | 8/1987 | MacDonald | B05B 1/042 | 239/592 |
| 5,265,383 | A * | 11/1993 | Shank, Jr. | B24C 11/00 | 451/90 |
| 6,969,015 | B1 * | 11/2005 | Salmela | B05B 1/042 | 239/455 |
| 9,302,368 | B2 * | 4/2016 | Mase | B24C 5/04 | |
| 11,517,920 | B2 * | 12/2022 | Kato | B05B 1/044 | |
| 2008/0116302 | A1 * | 5/2008 | Sloan | B05B 15/65 | 239/597 |
| 2009/0193615 | A1 * | 8/2009 | Nguyen | B05B 1/042 | 15/415.1 |
| 2011/0168808 | A1 * | 7/2011 | Mitch | B05B 1/1663 | 239/163 |
| 2017/0113326 | A1 * | 4/2017 | Nguyen | B05B 1/044 | |

* cited by examiner

FOAM NOZZLE SPREADER TIP

REFERENCE TO RELATED APPLICATIONS

This application claims the benefit of U.S. Provisional Application No. 63/483,617, filed on Feb. 7, 2023 and U.S. Provisional Application No. 63/484,892, filed on Feb. 14, 2023. The provisional application and all other publications and patent documents referred to throughout this nonprovisional application are incorporated herein by reference.

TECHNICAL FIELD

The present disclosure is generally related to foam nozzle tips for spraying foams.

DESCRIPTION OF THE RELATED ART

Previously, to achieve a flat horizontal "V" pattern when using a test nozzle assembly, the accepted method was to incorporate a Bernz-O-Matic Model TX1527 Flame Spreader Tip (FIG. 1). The TX1527 is believed to be made of a brass alloy and is a press formed part having a very thin wall thickness of approximately 0.047". This wall thickness makes the TX1527 susceptible to damage during normal use. The damage alters the foam pattern produced making the tip unusable for foam testing and must be replaced. For attaching, the TX1527 would be slid over the nozzle assembly at the outlet most point of the assembly, however due to the very tight fit when being attached to the nozzle assembly and the very thin wall of the piece itself, the stock tension screw for the TX1527 lacked enough holding ability while the nozzle assembly was in use. Therefore, it is affixed with heat resistant aluminum tape that must be changed often to ensure the TX1527 does not fall off during use of the nozzle. The TX1527 was discontinued in 2015 and is no longer available. Therefore, a replacement spreader tip is necessary.

SUMMARY OF THE INVENTION

Disclosed herein is an article comprising a monolith comprising brass or stainless steel and comprising a first surface, a hollow space removed from the first surface, a first screw hole and a second screw hole through the article and the first surface but not touching the hollow space, and a third screw hole through the article touching the hollow space. The article has a width of at least 51 mm at the widest part of the article. The article has a height of at least 48 mm at the highest part of the article. The article has a thickness of at least 13 mm at the thickness part of the article. The hollow space comprises a half-cylinder region and a rounded trapezoidal prism region. The half-cylinder comprises a rectangular face flush with the first surface of the article, a first end that is flush with a first end of the article, a second end in the interior of the article, and a curved surface in the interior of the article. The half-cylinder has a diameter of 18±0.05 mm parallel to the width of the article. The third screw hole touches the curved surface. The rounded trapezoidal prism region comprises a flat face flush with the first surface of the article, a rounded face opposed to the flat face and in the interior of the article, a short base flush with the second end of the half-cylinder, a long base opposed to the short base and flush with a convex second end of the article opposed to the first end of the article and having a width of 44±0.05 mm, a maximum height of 1.75±0.05 mm, and two rounded corners on the rounded face, and a first leg and a second leg, each connecting the short base to the long base and forming an interior angle of 112±1° with the short base.

BRIEF DESCRIPTION OF DRAWINGS

A more complete appreciation will be readily obtained by reference to the following Description of the Example Embodiments and the accompanying drawings.

DETAILED DESCRIPTION

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Figure 1:
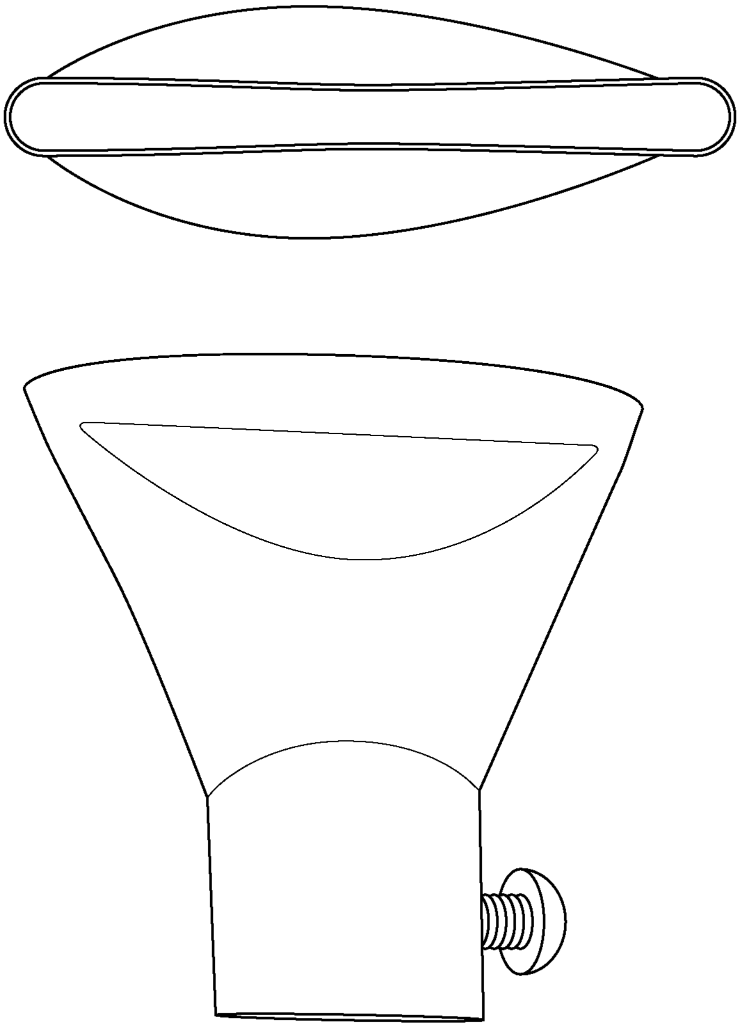
FIG. 1 shows photographs of a Bernz-O-Matic Model TX1527 Flame Spreader Tip.
Figure 2:
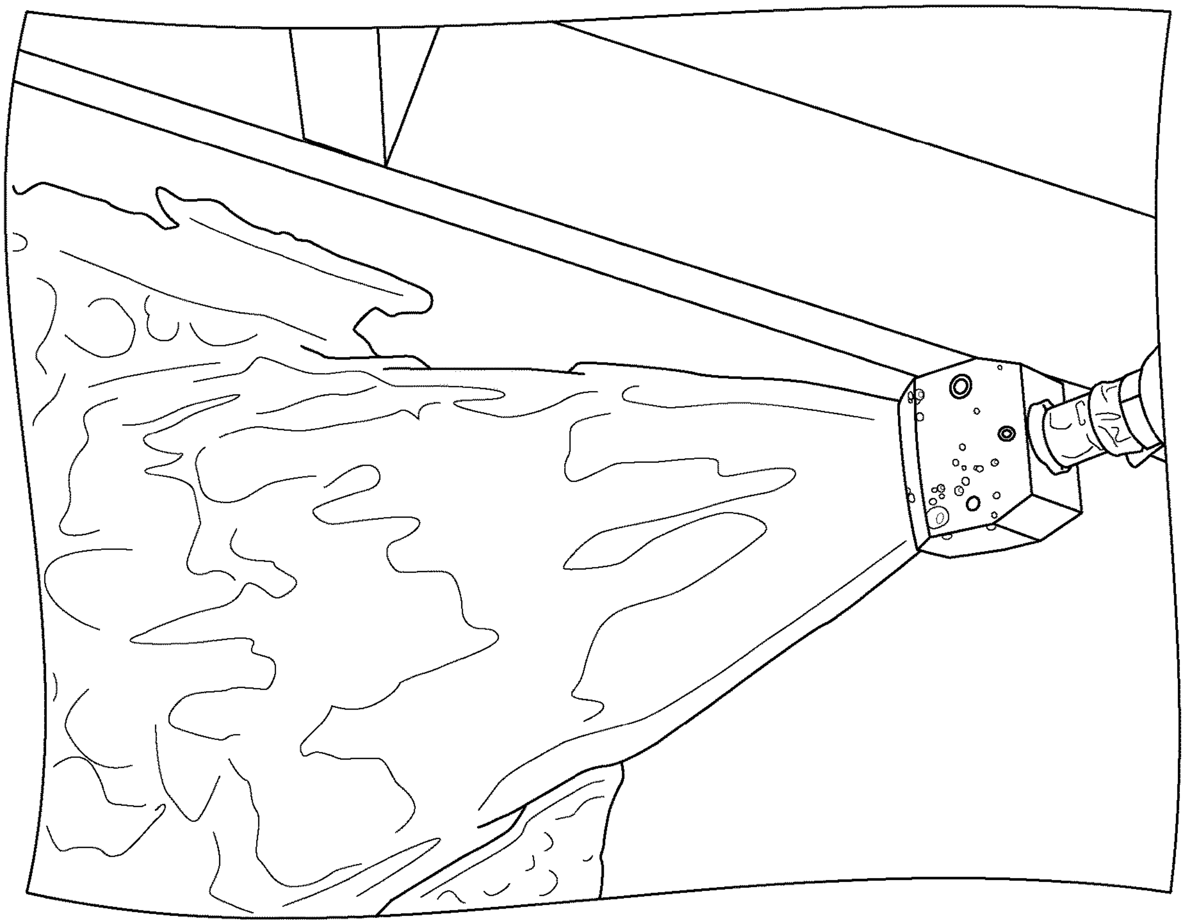
FIG. 2 shows a photograph of the Foam Nozzle Spreader Tip "V" Spray Pattern.

The Foam Nozzle Spreader Tip may be attached to the foam testing nozzle assembly associated with military performance specifications MIL-PRF-24385 "Fire Extinguishing Agent, Aqueous Film-Forming Foam (AFFF) Liquid Concentrate, For Fresh and Sea Water" and MIL-PRF-32725 "Fire Extinguishing Agent, Fluorine-Free (F3) Liquid Concentrate, For Land-Based, Fresh Water Applications". It acts to evenly spread the outlet flow of foam solution in a flat horizontal "V" pattern (FIG. 2) and producing foam with a similar expansion ratio as the TX1527.

Figure 3:
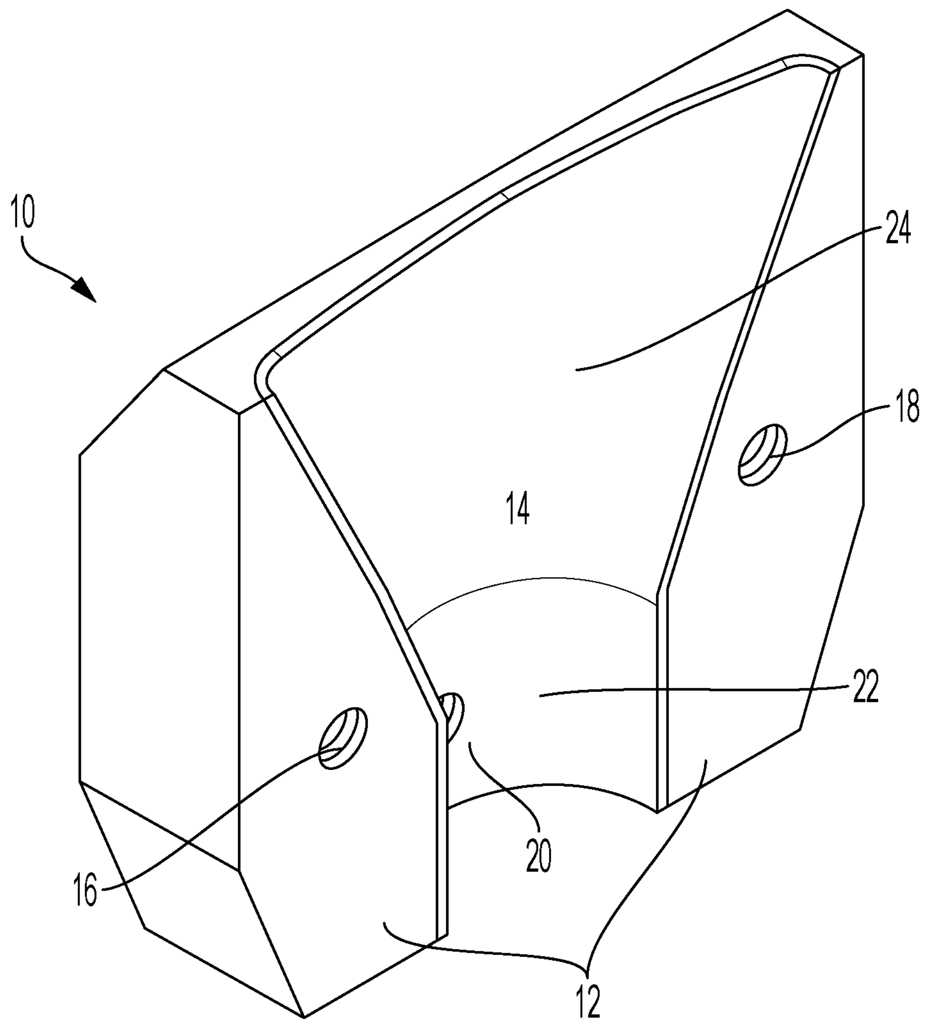
FIG. 3 shows a schematic illustration of the article.

FIG. 3 shows a simplified schematic illustration of the article to show the required elements. Article 10 is a monolith having a first surface 12, a hollow space 14, a first screw hole 16, a second screw hole 18, and a third screw hole 20. The first surface is the entire plane on that side of the article, even though it is divided into two parts.

Figure 4:
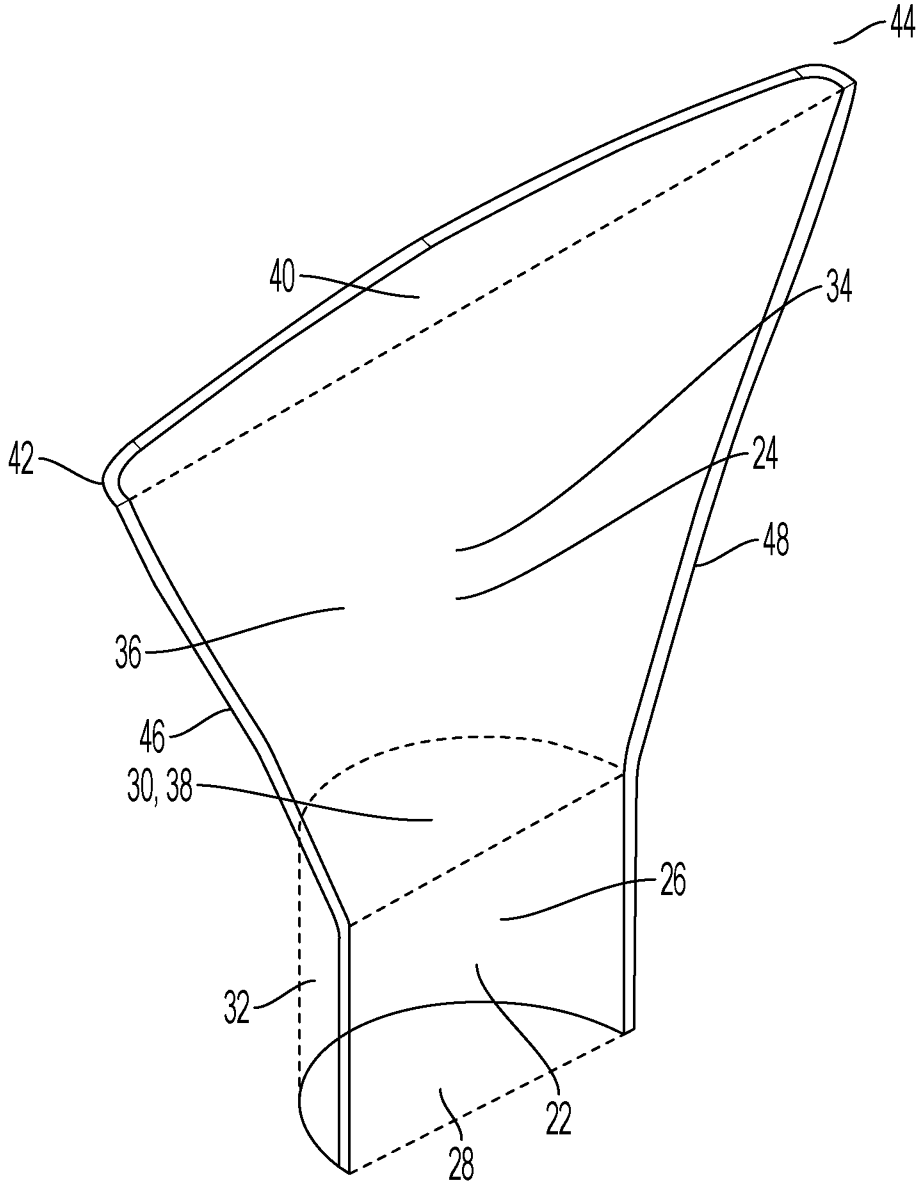
FIG. 4 shows a schematic illustration of the hollow space in the article.
Figure 5:
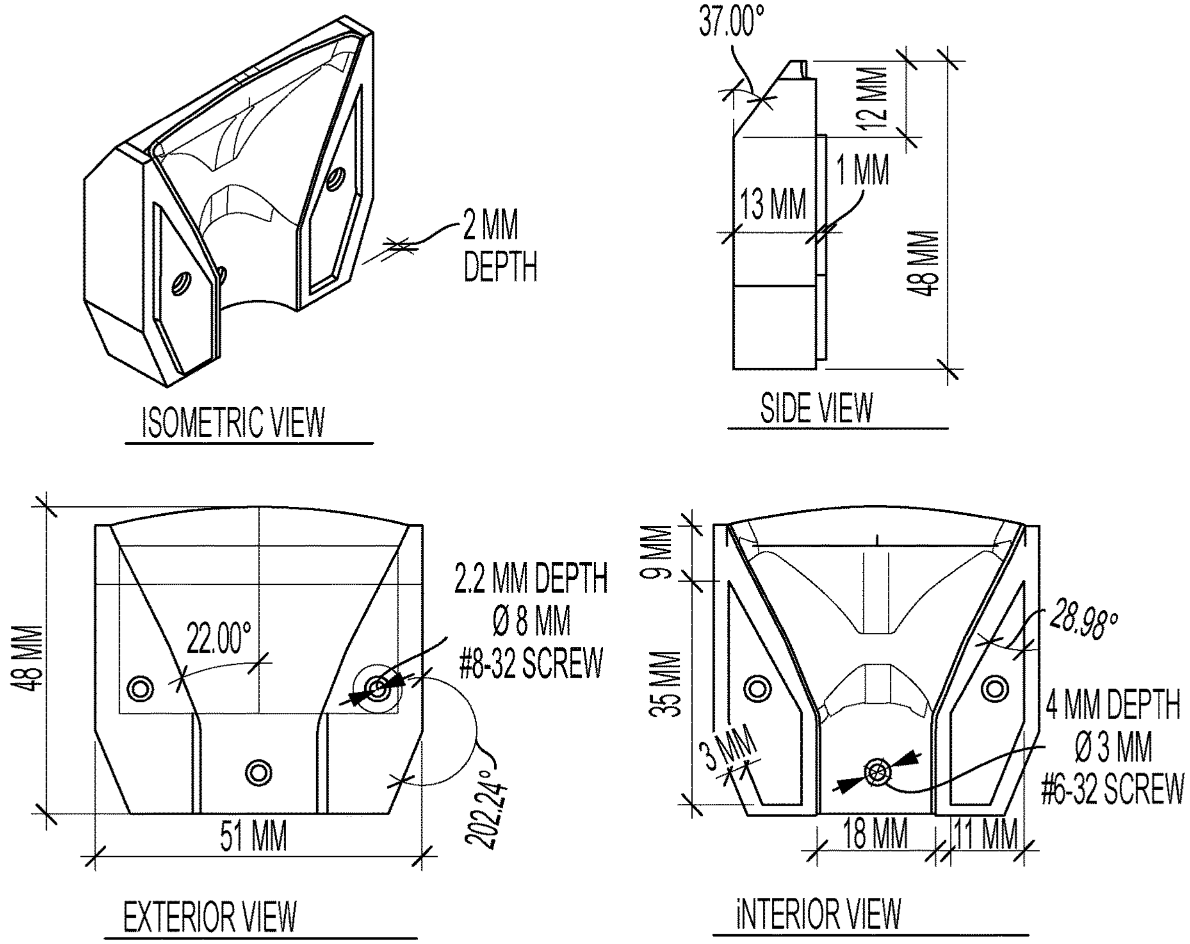
FIG. 5 shows the left half detail of one of the articles.
Figure 6:
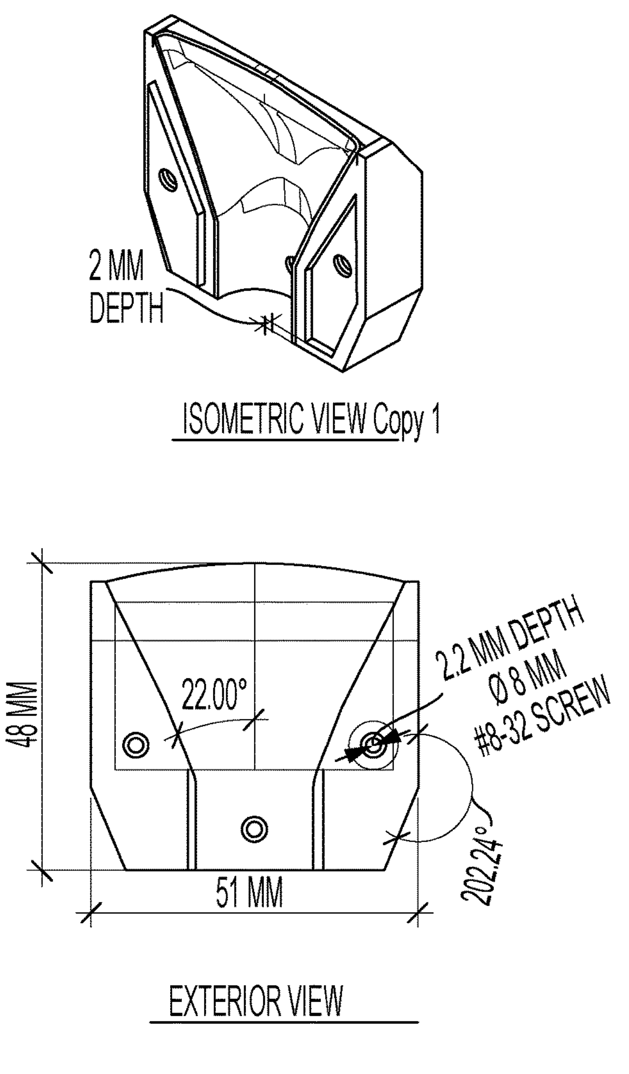
FIG. 6 shows the right half detail of one of the articles.
Figure 7:
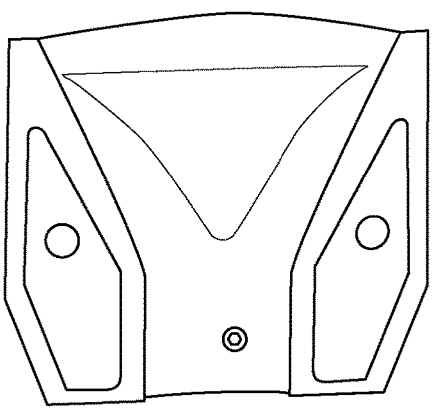
FIG. 7 shows a photograph of the inside surfaces of both halves.
Figure 8:
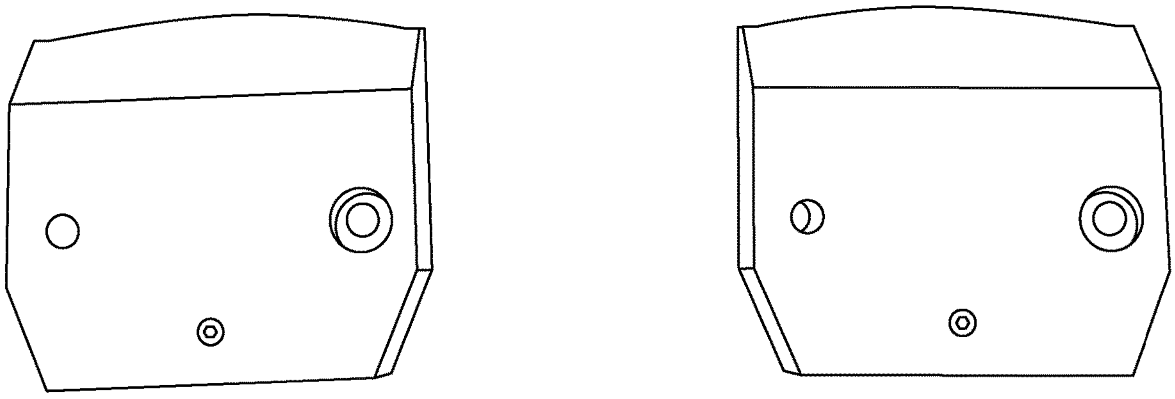
FIG. 8 shows a photograph of the outside surfaces of both halves.

FIG. 4 shows just the hollow space. The hollow space has two regions: a half-cylinder region 22 and a rounded trapezoidal prism region 24. The half-cylinder 22 has a rectangular face flush with the first surface of the article 26, a first end 28 that is flush with a first end of the article, a second end 30 in the interior of the article, and a curved surface 32 in the interior of the article.

The rounded trapezoidal prism 24 has a flat face 34 flush with the first surface of the article, a rounded face 36 opposed to the flat face and in the interior of the article, a short base 38 flush with the second end 30 of the half-cylinder, a long base 40 opposed to the short base 38 and flush with a convex second end of the article opposed to the first end of the article and having a width of 44±0.05 mm, a maximum height of 1.75±0.05 mm, and two rounded corners 42, 44 on the rounded face, and a first leg 46 and a second leg 48, each connecting the short base 38 to the long base 40 and forming an interior angle of 112±1° with the short base 38.

Figure 9:
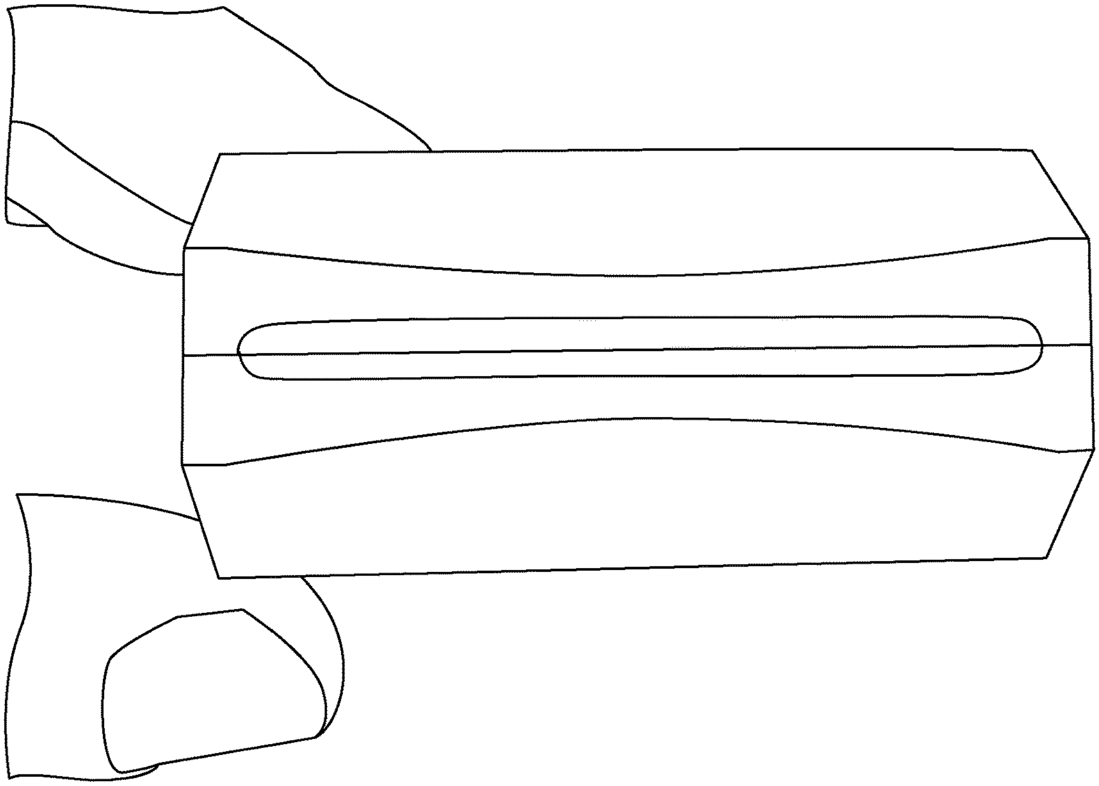
FIG. 9 shows a photograph of the front face showing foam flow outlet.
Figure 10:
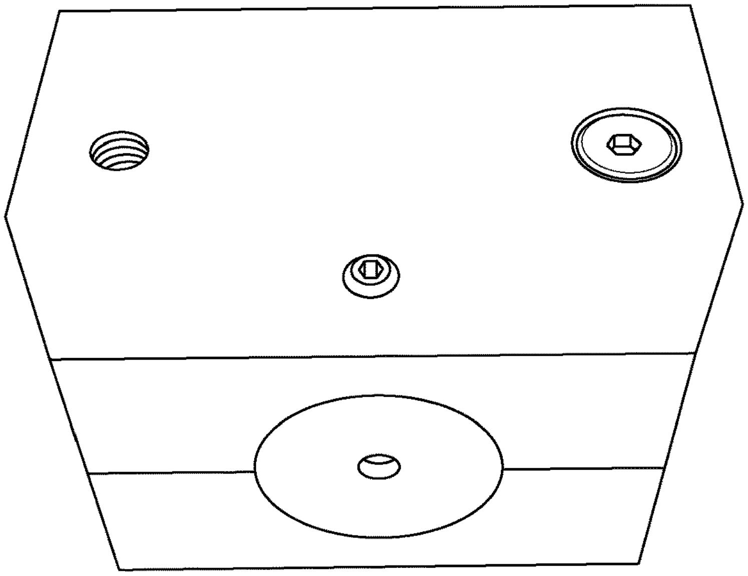
FIG. 10 shows a photograph of the rear face showing hole that slides over the outlet nipple on the Foam Nozzle assembly.
Figure 11:
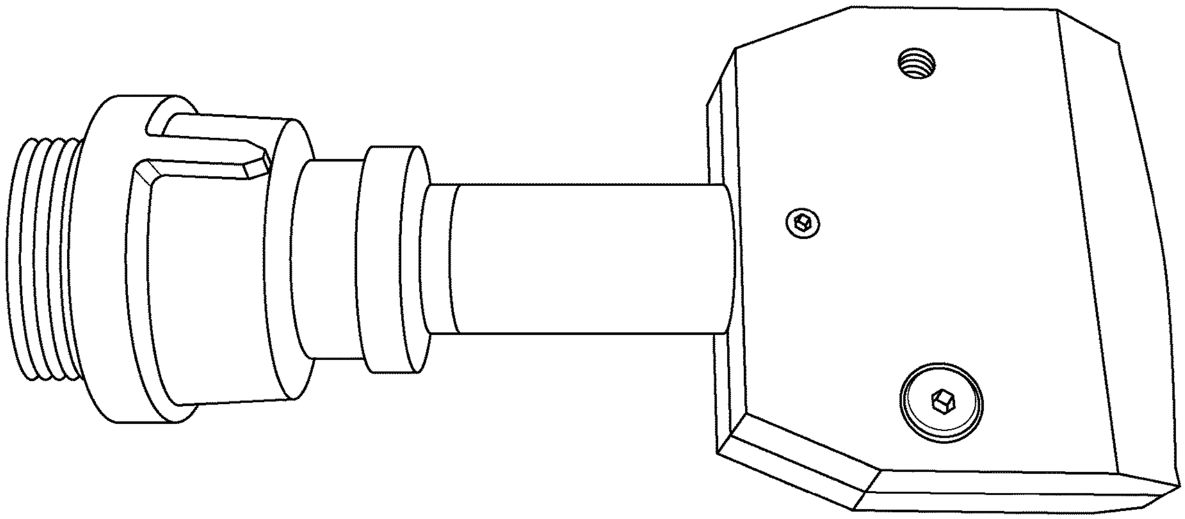
FIG. 11 shows a photograph of the Foam Nozzle Spreader Tip installed with set screws

The Foam Spreader Tip is a two-part assembly made from two parts (FIGS. 5-8) that when assembled (FIGS. 9 and 10) have finished dimensions of 55 mm wide, 48 mm long, and 26 mm thick. The front face has a slight radius and tapers from the top and bottom edges towards the center opening that is approximately 3.5 mm wide by 44 mm long (FIG. 9) from where the foam solution will exit. To accommodate installation onto the foam nozzle assembly (FIG. 11) the rear face has an 18 mm diameter hole located in the center of the face (FIG. 10) that is intended to slide onto/over the end of the outlet nipple of the foam nozzle assembly (FIG. 11).

The halves may be machined from C360 brass stock, designed to fit together in only one orientation by use of embossed, elongated pentagon shapes with matching recesses (FIGS. 5 and 6) and so that both halves seal against one another without need for gasket material when assembled to make the finished Foam Nozzle Spreader Tip. The surface of each half that creates the inside volumetric shape and surfaces on both halves of the Foam Nozzle Spreader Tip may be machined to a surface finish of 0.54 microns or better. For final assembly of the Foam Nozzle Spreader Tip, #8-32 socket cap screws may be used to secure the two halves together. Once assembled, the Foam Nozzle Spreader Tip is slid over the outlet nipple of the Foam Nozzle Assembly and may be fastened in place using two #6-32 fine point set screws.

The Foam Nozzle Spreader Tip is sturdier and more robust than and doesn't easily sustain damage like the TX1527, It also provides a more uniform foam flow and doesn't require the applying and reapplying of high heat aluminum tape to hold it in place while perform a foam test.

The two-part design makes the Foam Nozzle Spreader Tip reproducible by anyone with access to standard machining processes unlike the TX1527 which was only made using a metal stamping process and was only available from one manufacturer until 2015 when it was discontinued. The two-piece design also allows for dis-assembly of the Foam Spreader Tip for cleaning should any debris be caught inside. With the one-piece stamped design of the TX1527, this was not possible.

304 and 316 stainless steel as well as other brass alloys may be used in place of C360 brass. Machining processes other than CNC Machining may be used for manufacturing purposes if the machining process selected can ensure the required level of surface finish to the internal volumetric shape of the Foam Nozzle Spreader Tip.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

The invention claimed is:

1. An article comprising:

a monolith comprising brass or stainless steel and comprising:

a first surface;

a hollow space removed from the first surface;

a first screw hole and a second screw hole through the article and the first surface but not touching the hollow space; and a third screw hole through the article touching the hollow space;

wherein the article has a width of at least 51 mm at the widest part of the article;

wherein the article has a height of at least 48 mm at the highest part of the article;

wherein the article has a thickness of at least 13 mm at the thickest part of the article;

wherein the hollow space comprises:

a half-cylinder region; and a rounded trapezoidal prism region;

wherein the half-cylinder comprises:

a rectangular face flush with the first surface of the article;

a first end that is flush with a first end of the article;

a second end in the interior of the article;

a curved surface in the interior of the article; and a diameter of 18±0.05 mm parallel to the width of the article;

wherein the third screw hole touches the curved surface;

wherein the rounded trapezoidal prism region comprises:

a flat face flush with the first surface of the article;

a rounded face opposed to the flat face and in the interior of the article;

a short base flush with the second end of the half-cylinder;

a long base opposed to the short base and flush with a convex second end of the article opposed to the first end of the article and having two rounded corners on the rounded face; and a first leg and a second leg, each connecting the short base to the long base and forming an interior angle of 112±1° with the short base.

2. An apparatus comprising:

a first article of claim 1;

a second article of claim 1;

wherein the first surface of the first article and the first surface of the second article are in co-extensive contact;

a first screw through the first screw hole of the first article and the second screw hole of the second article, securing the first article to the second article; and a second screw through the second screw hole of the first article and the first screw hole of the second article, securing the first article to the second article;

wherein the half-cylinder region of the first article and the half-cylinder region of the second article together form a full cylinder.

3. A method comprising:

providing the apparatus of claim 2;

inserting an outlet nipple of a foam nozzle assembly into the full cylinder;

inserting one or two third screws into the third screw hole of the first article, the third screw hole of the second article, or both to secure the apparatus to the outlet nipple.

4. The method of claim 3, further comprising:

dispensing a foam through the outlet nipple and an opening formed by the rounded face of the first article and the rounded face of the second article.

* * * * *